(12) United States Patent
Wang et al.

(10) Patent No.: US 6,555,631 B1
(45) Date of Patent: Apr. 29, 2003

(54) MANUFACTURE OF POLYETHYLENES

(75) Inventors: Lin Wang, Hockessin, DE (US); Maria Spinu, Hockessin, DE (US); Joel David Citron, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 44 days.

(21) Appl. No.: 09/672,612

(22) Filed: Sep. 28, 2000

Related U.S. Application Data

(60) Provisional application No. 60/156,588, filed on Sep. 29, 1999.

(51) Int. Cl.$^7$ .............................. C08F 4/64; C08F 4/70; C08L 23/04
(52) U.S. Cl. .................. 526/113; 526/114; 526/115; 526/117; 526/118; 526/119; 502/113; 502/117; 502/129; 502/152; 502/155; 502/167; 525/240
(58) Field of Search ................. 525/240; 526/115, 526/119, 113, 114, 117, 118; 502/113, 117, 129, 152, 155, 167

(56) References Cited

U.S. PATENT DOCUMENTS

| | | |
|---|---|---|
| 5,071,927 A | 12/1991 | Benham et al. |
| 5,137,994 A | 8/1992 | Goode et al. |
| 5,587,501 A | 12/1996 | Winter et al. |
| 5,686,542 A | 11/1997 | Ostoja-Starzewski et al. |
| 5,753,785 A | 5/1998 | Reddy et al. |
| 5,856,610 A | 1/1999 | Tamura et al. |
| 6,262,196 B1 * | 7/2001 | Mecking ..................... 526/114 |

FOREIGN PATENT DOCUMENTS

| | | |
|---|---|---|
| WO | WO 90/15085 | 12/1990 |
| WO | WO 97/48735 | 12/1997 |
| WO | WO98/38228 | * 9/1998 |
| WO | WO 99/50318 | 10/1999 |

OTHER PUBLICATIONS

Mecking, Stefan, Macromol. Rapid Commun. 20 (1999) 139–143.*
Mecking, S., Reactor blending with early/late transition metal catalyst combinations in ethylene polymerization, Macromol. Rapid Commun., 1999, p. 139–143, vol. 20, No. 3.
International Search Report PCT/US00/26643 dated Sep. 28, 2000.
Denger, et al., *Simultaneous oligomerization and polymerization of ethylene*, Makromol. Chem., Rapid Commun., 1991, p. 697–701, vol. 12.
Benham, E. A. et al., *A Process for the Simultaneous Oligomerization and Copolymerization of Ethylene*, Polymer Engeineering and Science, 1988, p. 1469–1472, vol. 28, No. 22.

* cited by examiner

*Primary Examiner*—David W. Wu
*Assistant Examiner*—R. Rabago

(57) ABSTRACT

Blends of two or more polyethylenes are made by reacting ethylene with an oligomerization catalyst that forms α-olefins, and two polymerization catalysts, one of which under the process conditions copolymerizes ethylene and α-olefins, and the other of which under process conditions does not readily copolymerize ethylene and α-olefins. The blends may have improved physical properties and/or processing characteristics.

20 Claims, No Drawings

US 6,555,631 B1

MANUFACTURE OF POLYETHYLENES

CROSS-REFERENCE TO RELATED APPLICATION

This application claims priority under 35 U.S.C. §119 from U.S. Provisional Application Ser. No. 60/156,588 (filed Sep. 29, 1999), which is incorporated by reference herein as if fully set forth.

FIELD OF THE INVENTION

Blends of polyethylenes may be manufactured by using various combinations of ethylene polymerization catalysts what may or may not copolymerize α-olefins and ethylene, and ethylene oligomerization catalysts that produce α-olefins.

TECHNICAL BACKGROUND

Polyethylenes are important items of commerce, these being produced in larger volumes than any other polymer. Many different grades of this polymer type are produced, these differing grades varying in many properties, including cost. For an overview of polyethylenes, see B. Elvers, et al., Ed., *Ullmann's Encyclopedia of Industrial Chemistry, 5$^{th}$* Ed., Vol. A21, VCH Verlagsgesellschaft, Weinheim, 1992, p. 488–518; and H. Mark et al., Ed., *Encyclopedia of Polymer Science and Engineering*, Vol. 6, John Wiley & Sons, New York, 1986, p. 383–489.

Aside from cost the two major property areas of concern to most users (polymer processors) are final polymer physical properties, that is does the polymer have physical properties suitable for the end use, and how difficult is it to form the polymer into the final article, often called processability. In some instances polyethylene compositions having desirable properties are obtained by blending two or more polyolefins, at least one of which is a polyethylene, together. These blends may be formed by melt blending the separate blend polymers, or by forming two or more of the blend polymers in a single polymerization system (these may be sequential or simultaneous polymerizations). The latter is often preferred because such blends are often more uniform, and the cost of a separate mixing step is avoided.

Blends may be formed to improve physical properties and/or processing properties. For instance, high density polyethylene is sometimes not as tough as desired, so it may be blended with a less crystalline polymer, such as a lower melting (even elastomeric) copolymer of ethylene and an α-olefin (or other polyolefin), to toughen the resulting product. Therefore improved methods of making blends of polyethylene polymers are of interest.

Various reports of "simultaneous" oligomerization and polymerization of ethylene to form (in most cases) branched polyethylenes have appeared in the literature, see for instance WO90/15085, WO99/50318, U.S. Pat. Nos. 5,753,785, 5,856,610, 5,686,542, 5,137,994 and 5,071,927; C. Denger, et al, *Makromol. Chem. Rapid Commun.*, vol. 12, p. 697–701 (1991), and E. A. Benham, et al., *Polymer Engineering and Science*, vol. 28, p. 1469–1472 (1988). All of the above are incorporated by reference herein for all purposes as if fully set forth.

None of these references specifically describes any of the processes or branched homopolyethylenes of the present invention.

SUMMARY OF THE INVENTION

This invention concerns a process for producing a blend of two or more polyethylenes, comprising the step of contacting:

(1) ethylene;

(2) an active ethylene oligomerization catalyst under conditions to oligomerize at least a portion of the ethylene to one or more α-olefins of the general formula $R^{18}CH=CH_2$, wherein $R^{18}$ is an alkyl containing an even number of carbon atoms;

(3) a first active polymerization catalyst under conditions to copolymerize ethylene and the α-olefins generated from the active ethylene oligomerization catalyst; and (4) a second active polymerization catalyst under conditions to polymerize ethylene, but not readily copolymerize ethylene and α-olefins.

This invention also concerns a polymerization catalyst component, comprising:

(a) an oligomerization catalyst that oligomerizes ethylene to one or more α-olefins of the formula $H_2C=CHR^{18}$, wherein $R^{18}$ is an alkyl containing an even number of carbon atoms;

(b) a first polymerization catalyst that is capable of copolymerizing ethylene and one or more α-olefins of the formula $H_2C=CHR^{18}$;

(c) a second polymerization catalyst chemically distinct from the first polymerization catalyst, that is capable of polymerizing ethylene but does not readily copolymerize ethylene and α-olefins;

(d) optionally one or more catalyst supports onto which one or more of (a), (b) and/or (c) has been supported; and (e) optionally one or more catalyst activators for (a), (b) and/or (c).

This invention also concerns a first polymer blend comprising:

(a) a first polyethylene that contains at least three different branches of the formula $—(CH_2CH_2)_nH$, wherein n is an integer of 1 or more, and (b) a second polyethylene that is different from the first polyethylene, in a weight ratio of about 1:4 to about 4:1 based on the total weight of the first and second polyethylenes, and provided that said second polyethylene has a melting point at least 20° C. higher than said first polyethylene, or said second polyethylene has a heat of fusion at least 50 J/g greater than said first polyethylene, or both.

Also described herein is a second polymer blend comprising:

(a) a third polyethylene having a density of less than 0.93 g/mL, containing at least 2 ethyl branches, at least 2 hexyl or longer branches and at least one butyl branch per 1000 methylene groups, and provided that said third polyethylene has fewer than 5 methyl branches per 1000 methylene groups; and (b) a fourth polyethylene having a density of 0.93 g/mL or more.

This invention also includes a third polymer blend comprising:

(a) a fifth polyethylene containing about 20 to about 150 branches of the formula $—(CH_2CH_2)_nH$ per 1000 methylene groups, wherein n is an integer of 1 to 100, provided that said fifth polyethylene has less than about 20 methyl branches per 1000 methylene groups; and (b) a sixth polyethylene that is different from the fifth polyethylene and has a density of about 0.93 g/mL or more.

DETAILED DESCRIPTION OF THE PREFERRED EMBODIMENTS

Herein certain terms are used which are defined below.

By "hydrocarbyl" is meant a univalent radical containing only carbon and hydrogen. As examples of hydrocarbyls may be mentioned unsubstituted alkyls, cycloalkyls and aryls. If not otherwise stated, it is preferred that the hydrocarbyl groups herein contain 1 to 30 carbon atoms, and more preferably 1 to 20 carbon atoms.

By "substituted hydrocarbyl" herein is meant a hydrocarbyl group that contains one or more "inert functional groups" that are inert under the process conditions to which the compound containing these groups is subjected. The inert functional groups also do not substantially interfere with the oligomerization/polymerization process. For example, in cases in which the inert functional group may be near the complexed iron atom, such as $R^4$ or $R^5$ in formula (I) (shown below), or as a substituent on $R^4$, $R^5$, $R^6$ or $R^7$, the inert functional group should not coordinate to the iron atom more strongly than the three depicted N groups in (I) which are the desired coordinating groups—that is, the functional group should not displace one or more of the desired coordinating N groups. The hydrocarbyl may be completely substituted, as in trifluoromethyl. If not otherwise stated, it is preferred that substituted hydrocarbyl groups herein contain 1 to about 30 carbon atoms. Included in the meaning of "substituted" are heterocyclic rings.

Examples of inert functional groups include halo (fluoro, chloro, bromo and iodo), ester, keto (oxo), amino, imino, carboxyl, phosphite, phosphonite, phosphine, phosphinite, thioether, amide, nitrile, and ether. Preferred inert functional groups are halo, ester, amino, imino, carboxyl, phosphite, phosphonite, phosphine, phosphinite, thioether, and amide. With respect to catalysts based on ligands (I) and (II) described below, which inert functional groups are useful in which oligomerizations/polymerizations may in some cases be determined by reference to U.S. Pat. Nos. 5,955,555, 6,103,946 and WO98/30612, all of which are hereby incorporated by reference for all purposes as if fully set forth.

By an oligomerization or polymerization "catalyst activator" is meant a compound that reacts with a transition metal compound to form an activated catalyst species. A preferred catalyst activator is an alkylaluminum compound, that is, a compound which has at least one alkyl group bound to an aluminum atom.

By "relatively noncoordinating" (or "weakly coordinating") anions are meant those anions as are generally referred to in the art in this manner, and the coordinating ability of such anions is known and has been discussed in the literature. See, for instance, W. Beck et al., Chem. Rev., vol. 88, pp. 1405–1421 (1988), and S. H. Strauss, Chem. Rev., vol. 93, pp. 927–942 (1993), both of which are hereby included by reference. Among such anions are those formed from aluminum compounds (such as those described in the immediately preceding paragraph) and X⁻ (an anion as discussed in further detail below), including $(R^{29})_3AlX^-$, $(R^{29})_2AlClX^-$, $R^{29}AlCl_2X^-$, and $R^{29}AlOX^-$, wherein $R^{29}$ is alkyl. Other useful noncoordinating anions include BAF⁻ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_6)_4B^-$.

By a "primary carbon group" herein is meant a group of the formula —CH₂---, wherein the free valence --- is to any other atom, and the bond represented by the solid line is to a ring atom of an aryl or substituted aryl to which the primary carbon group is attached. Thus the free valence --- may be bonded to a hydrogen atom, a halogen atom, a carbon atom, an oxygen atom, a sulfur atom, etc. In other words, the free valence --- may be to hydrogen, hydrocarbyl, substituted hydrocarbyl or a functional group. Examples of primary carbon groups include —CH₃, —CH₂CH(CH₃)₂, —CH₂Cl, —CH₂C₆H₅, —OCH₃ and —CH₂OCH₃.

By a secondary carbon group is meant the group

wherein the bond represented by the solid line is to a ring atom of an aryl or substituted aryl to which the secondary carbon group is attached, and both free bonds represented by the dashed lines are to an atom or atoms other than hydrogen. These atoms or groups may be the same or different. In other words the free valences represented by the dashed lines may be hydrocarbyl, substituted hydrocarbyl or inert functional groups. Examples of secondary carbon groups include —CH(CH₃)₂, —CHCl₂, —CH(C₆H₅)₂, cyclohexyl, —CH(CH₃)OCH₃, and —CH=CCH₃.

By a "tertiary carbon group" is meant a group of the formula

wherein the bond represented by the solid line is to a ring atom of an aryl or substituted aryl to which the tertiary carbon group is attached, and the three free bonds represented by the dashed lines are to an atom or atoms other than hydrogen. In other words, the bonds represented by the dashed lines are to hydrocarbyl, substituted hydrocarbyl or inert functional groups. Examples of tetiary carbon groups include —C(CH₃)₃, —C(C₆H₅)₃, —CCl₃, —CF₃, —C(CH₃)₂OCH₃, —C≡CH, —C(CH₃)₂CH=CH₂, aryl and substituted aryl such as phenyl and 1-adamantyl.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

Herein two or more polyethylenes are made. By a "polyethylene" is meant a polymer in which at least 50 mole percent, preferably at least 70 mole percent, and more preferably at least 80 mole percent of the repeat units are derived from ethylene in the polymerization process. By a "homopolyethylene" herein is meant a polymer in which substantially all of the repeat units are derived from ethylene in the polymerization process. "Derived from ethylene" includes any comonomers generated in situ (either simultaneously with or in series with the actual polymerization) from ethylene such as, for example, those ethylene oligomers formed by the ethylene oligomerization catalyst.

The comonomer, whether formed in situ or added separately to the polymerization, is a series of α-olefins of the formula H₂C=CHR¹⁸, wherein R¹⁸ is an alkyl containing an even number of carbon atoms. Other α-olefins, such as those in which R¹⁸ contains an odd number of carbons may optionally be present. It is preferred that the series of α-olefins comprises individual α-olefins in which R¹⁸ contains 2, 4, 6, 8, 10, 12, 14, 16 and optionally higher carbon atoms. It is also preferred that the series of α-olefins comprises 5 mole percent or more, more preferably 10 mole percent or more, and especially preferably 15 mole percent or more, of α-olefins in which R¹⁸ contains 10 or more carbon atoms, based on the total moles of α-olefins in the series. Preferably the oligomerization catalyst produces an α-olefin mixture that has an average degree of oligomerization (that is the average number of ethylene units per molecule) of 30 or less, more preferably 15 or less.

If the series of olefins is added to the polymerization (i.e., it is not a homopolyethylene) or the olefins are made first in series with the polymerization reaction and thus may be sampled, the olefin series being used may be analyzed, as by gas chromatography, to see if any of the above compositional limits on the olefin series are being met. If the olefin series is produced in situ simultaneously with the polymerization reaction, it may not be possible to obtain a representative sample of the olefin series. Generally the olefin series will be produced in situ by an ethylene oligomerization catalyst which forms the requisite olefins from ethylene, and is active in the absence of the first and second polymerization catalysts (see below). In this instance an oligomerization may be run in the absence of the polymerization catalyst(s) to produce only the series of olefins, under conditions which reasonably mimic the combined oligomerization/polymerization. The series of olefins thus obtained is then analyzed (as by gas chromatography) to determine if it meets appropriate limitations. Typical analyses of such series of olefins may be found in previously incorporated U.S. Pat. No. 6,103,946. It is assumed herein that the incorporation of α-olefins into a branched polyethylene is in proportion to the relative amounts in which they are present in the polymerization process. This may not be totally correct in the event, for example, that a volatile olefin such as 1-butene is partially "lost" to the polymerization reaction.

Oftentimes when such a series of olefins is made from ethylene a measure of the molecular weights of the olefins obtained is factor K from the Schulz-Flory theory (see for instance B. Elvers, et al., Ed. *Ullmann's Encyclopedia of Industrial Chemistry*, Vol. A13, VCH Verlagsgesellschaft mbH, Weinheim, 1989, p. 243–247 and 275–276. This is defined as:

$$K=n(C_{n+2} \text{ olefin})/n(C_n \text{ olefin})$$

wherein $n(C_n \text{ olefin})$ is the number of moles of olefin containing n carbon atoms, and $n(C_{n+2} \text{ olefin})$ is the number of moles of olefin containing n+2 carbon atoms, or in other words the next higher oligomer of $C_n$ olefin. From this can be determined the weight (mass) fractions of the various olefins in the resulting oligomeric reaction product mixture. The K factor is preferred to be in the range of about 0.55 to about 0.90, more preferably 0.65 to about 0.80. The K factor may also be varied by changing oligomerization conditions and/or the oligomerization catalyst, see for instance previously incorporated U.S. Pat. No. 6,103,946. By analyzing the branching pattern of the polymer produced one can roughly back calculate the K factor for the oligomerization to α-olefin, although there are possible errors (see below).

In one preferred embodiment, the polymer made is a homopolyethylene, and/or the series of olefins is prepared simultaneously with the polymerization reactions.

A preferred oligomerization catalyst for the preparation of the olefins is described in previously incorporated U.S. Pat. No. 6,103,946. More preferably, the oligomerization catalyst is an Fe complex (Fe[II] or Fe[III]) of a ligand of the general formula (I):

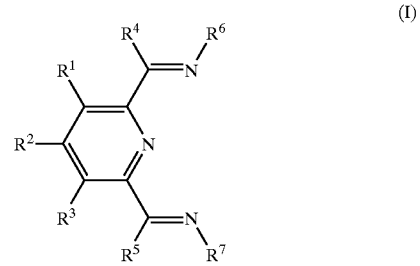

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

More specifically, the preferrred oligomerization catalyst is an Fe complex (Fe[II] or Fe[III]) of a ligand of the general formula (I), wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:
  in $R^6$, a second ring atom adjacent to said first ring atom is bound to a halogen, a primary carbon group, a secondary carbon group or a tertiary carbon group; and further provided that
  in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or
  in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or
  in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

By a "first ring atom in $R^6$ and $R^7$ bound to an imino nitrogen atom" is meant the ring atom in these groups bound to an imino nitrogen shown in (I), for example

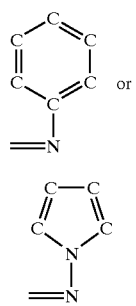

(III)

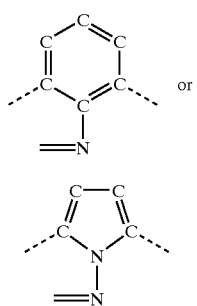

(IV)

the atoms shown in the 1-position in the rings in (III) and (IV) are the first ring atoms bound to an imino carbon atom (other groups which may be substituted on the aryl groups are not shown). Ring atoms adjacent to the first ring atoms are shown, for example, in (V) and (VI), where the open valencies to these adjacent atoms are shown by dashed lines (the 2,6-positions in (V) and the 2,5-positions in (VI)).

(V)

(VI)

Particularly preferred is a ligand of the formula (II):

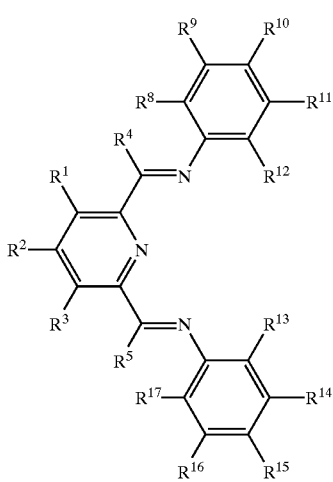

(II)

wherein: each of $R^1$, $R^2$, $R^3$, $R^4$, $R^5$, $R^9{}_1$, $R^{10}$, $R^{11}$, $R^{14}$, $R^{15}$ and $R^{16}$ is independently selected from the group consisting of hydrogen, hydrocarbyl, substituted hydrocarbyl and an inert functional group; and $R^8$ is halogen, a primary carbon group, a secondary carbon group or a tertiary carbon group;
provided that:
when $R^8$ is halogen or a primary carbon group none, one or two of $R^{12}$, $R^{13}$ and $R^{17}$ are independently a primary carbon group, an inert functional group or a trihalo tertiary carbon group, and the remainder of $R^{12}$, $R^{13}$ and $R^{17}$ are hydrogen;

when $R^8$ is a secondary carbon group, none or one of $R^{12}$, $R^{13}$ and $R^{17}$ is a primary carbon group, a secondary carbon group, a trihalo tertiary carbon group or an inert functional group, and the remainder of $R^{12}$, $R^{13}$ and $R^{17}$ are hydrogen;

when $R^8$ is a tertiary carbon group all of $R^{12}$, $R^{13}$ and $R^{17}$ are hydrogen;

any two of $R^1$, $R^2$ and $R^3$ vicinal to one another, taken together may form a ring; and any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

In one preferred embodiment of ligand (II), $R^4$ and $R^5$ are methyl or hydrogen; and/or $R^1$, $R^2$, and $R^3$ are all hydrogen; and/or $R^9$, $R^{10}$, $R^{11}$, $R^{14}$, $R^{15}$ and $R^{16}$ are all hydrogen; and/or $R^{17}$ is selected from the group consisting of methyl, ethyl, propyl isopropyl, halo and trihalomethyl; and/or $R^{12}$ is selected from the group consisting of hydrogen, methyl, ethyl, propyl, isopropyl, halo and trihalomethyl. In certain more preferred embodiments, both $R^{12}$ and $R^{17}$ are methyl or ethyl. In all such cases, $R^8$ is a primary carbon group, and $R^{13}$ is hydrogen.

In specific preferred embodiments of ligand (II):
$R^4$ and $R^5$ are methyl; $R^9$, $R^{10}$, $R^{11}$, $R^{13}$, $R^{14}$, $R^{15}$, and $R^{16}$ are all hydrogen; $R^{12}$ is hydrogen or methyl; $R^{17}$ is methyl; and $R^8$ is a primary carbon group; or $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or ethyl; $R^{17}$ is ethyl; and $R^8$ is a primary carbon group; or $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or isopropyl; $R^{17}$ is isopropyl; and $R^8$ is a primary carbon group; or $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or n-propyl; $R^{17}$ is n-propyl; and $R^8$ is a primary carbon group; or $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or chloro; $R^{17}$ is chloro; and $R^8$ is a primary carbon group; or $R^4$ and $R^5$ are methyl; $R^9$, $R^{10}$, $R^{11}$, $R^{13}$, $R^{14}$, $R^{15}$, and $R^{16}$ are all hydrogen; $R^{12}$ is hydrogen or trifluoromethyl; $R^{17}$ is trifluoromethyl; and $R^8$ is a primary carbon group.

In another preferred embodiment of ligand (II), $R^1$, $R^2$, $R^3$, $R^4$, $R^5$, $R^9$, $R^{10}$, $R^{11}$, $R^{14}$, $R^{15}$ and $R^{16}$ are as just defined, and if $R^8$ is a primary carbon group, $R^{12}$ and $R^{17}$ are hydrogen, and $R^{13}$ is a primary carbon group; or if $R^8$ is a secondary carbon group, $R^{12}$ and $R^{17}$ are hydrogen, and $R^{13}$ is a primary carbon group or a secondary carbon group.

Also preferred is when $R^8$ is a primary carbon group, preferably selected from methyl, ethyl, propyls and butyls.

There are two types of polymerization catalysts employed in the process herein, a first polymerization catalyst and a second polymerization catalyst. Although these will often be different chemically, it is possible that they are the same chemically but under different physical and/or process conditions that favor one type of polymerization over another. The terms "favor" one type of polymerization over another is relative in nature, and refers to the actual result (polymer) obtained from each of the catalysts under the process conditions.

For example, if the process is carried out as a continuous gas phase polymerization, the oligomerization catalyst and the polymerization catalysts will often be supported on fine particulate solids (such as silica, alumina, another organic polymer, magnesium chloride, sodium chloride, etc.). One may support the first polymerization and the oligomerization catalyst onto the same support particles, while supporting the second polymerization catalyst on different support particles (the support particles for each may the same or different materials). In this instance each support particle may be thought of as a minireactor, that is gaseous or other reactants, once reacted by the catalyst(s) on that support stay there, and may be further reacted if they are still reactive (i.e. (α-olefin). Thus the particles having the oligomerization catalyst and first polymerization catalyst are reactive towards forming α-olefin, which may then be copolymerized with ethylene by the first polymerization catalyst. The second polymerization catalyst, although it may be able to copolymerize ethylene and α-olefins, just makes a homopolyethylene containing at most a relatively small amount of branching due to α-olefin incorporation, because the in situ generated α-olefin is not readily available to this second catalyst for copolymerization. This is illustrated by Example 2 (below). In Example 2 the first and second polymerization catalysts are an identical metallocene which is capable of copolymerizing ethylene and α-olefins. Yet a semicrystalline polyethylene is part of the product. The melting point of this semicrystalline polyethylene indicates that it may have some branching due to incorporation of some α-olefin, but it does not have as much branching as the polyethylene produced by the combination of the oligomerization catalyst and the first polymerization catalyst (present on the same support particles). The "leakage" of α-olefin to the second polymerization catalyst particles is probably due to vaporization of lower molecular weight α-olefins, such as 1-butene, into the ethylene gas present, and subsequent copolymerization by the second polymerization catalyst.

It would therefore be preferable, if it is desired that the relatively higher melting point and nonbranched polyethylene produced by this process is or is very close to high density polyethylene (HDPE) with little or no branching (incorporation of α-olefin), to use as a second polymerization catalyst a material which has no or a reduced tendency to copolymerize ethylene with α-olefins. Such a second polymerization catalyst was used in Example 3, and it can be seen that although the overall polymer product has 25 branches/1000 CH$_2$ groups, the melting point of the overall polymer indicates that the relatively unbranched polymer contained therein (made by the second polymerization catalyst) is essentially HDPE.

The first polymerization catalyst for the copolymerization of the ethylene and the olefin series should be a catalyst that can copolymerize ethylene and α-olefins so that the relative rate of copolymerization of these two types of monomers are similar. Such catalysts include Ziegler-Natta-type catalysts and metallocene catalysts. These types of catalysts are well known in the polyolefin field, see for instance *Angew. Chem., Int. Ed. Engl.*, vol. 34, p. 1143–1170 (1995), EP-A-0416815 and U.S. Pat. No. 5,198,401 for information about metallocene-type catalysts; and J. Boor Jr., *Ziegler-Natta Catalysts and Polymerizations*, Academic Press, New York, 1979 for information about Ziegler-Natta-type catalysts, all of which are hereby incorporated by reference herein for all purposes as if fully set forth. Certain late transition metal catalysts may also be suitable, such as found in U.S. Pat. Nos. 5,880,241, 5,955,555 and 5,714,556, all of which are hereby incorporated by reference herein for all purposes as if fully set forth.

Many of the useful polymerization conditions for these types of catalysts and the oligomerizations catalysts coincide, so conditions for the polymerization are easily accessible. Oftentimes the "co-catalyst" or "activator" is needed for the copolymerization catalyst, much as W is sometimes needed for the oligomerization catalysts (as described below). In many instances the same compound, such as an alkylaluminum compound, may be used for these purposes for both types of catalysts.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well-known constrained geometry catalysts, as described in EP-A-0416815, EP-A-0420436, EP-A-0671404, EP-A-0643066 WO91/04257. Also the class of transition metal complexes described in, for example, WO98/30609, U.S. Pat. Nos. 5,880,241, 6,060,569 and 5,714,556 can be used. Also useful are transition metal complexes of bis (carboximidamidatonates), as described in WO00/12568 (corresponding to U.S. patent application Ser. No. 09/383, 900, filed Aug. 26, 1994, now U.S. Pat. No. 6,255,414). All of the aforementioned publications are incorporated by reference herein for all purposes as if fully set forth. Of the above, metallocene-type catalysts are preferred.

As noted above the second polymerization catalyst may be the same as, or different than the first polymerization catalyst, and therefore the second polymerization catalyst includes all those materials useful as first polymerization catalyst. As also noted above however the second polymerization may also be an ethylene polymerization catalyst that does not readily copolymerize ethylene and α-olefins, and these polymerization catalysts are preferred second polymerization catalysts. By "does not readily" is meant the second catalyst does not incorporate α-olefins in a copolymer with ethylene as well as the first polymerization catalyst and preferably has little or no tendency to do so, but it may incorporate some ax-olefin in the polyethylene it makes. Preferably it incorporates less than 5 mole percent of α-olefin (of the total repeat units), more preferably less than 1 mole percent and especially preferably less than 0.2 mole percent of these repeat units. Such incorporation may be measured by $^{13}$C NMR, especially after separating the polymers by TREF (see below).

A preferred second polymerization catalyst is an iron complex of a compound of the formula (III)

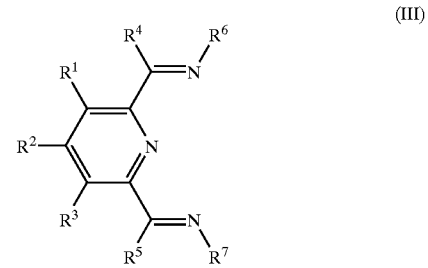

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

In (III) it is preferred that $R^6$ is

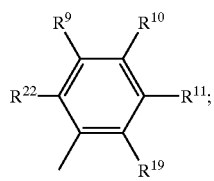

(IV)

and $R^7$ is

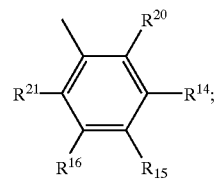

(V)

wherein:
$R^{20}$ and $R^{22}$ are each independently hydrocarbyl, substituted hydrocarbyl or an inert functional group;
$R^9$, $R^{10}$, $R^{11}$, $R^{14}$, $R^{15}$ and $R^{16}$ are as defined above;
$R^{19}$ and $R^{21}$ are each independently hydrogen, hydrocarbyl, substituted hydrocarbyl or an inert functional group;
and provided that any two of $R^9$, $R^{10}$, $R_{11}$, $R^{14}$, $R^{15}$, $R^{16}$, $R^{19}$, $R^{20}$, $R^{21}$ and $R^{22}$ that are vicinal to one another, taken together may form a ring.

It will be noted that, in the general description, (I) and (II) are subsets of (III), and therefore when choosing (III) (or its iron complex), an oligomerization catalyst should not be chosen as the second polymerization catalyst. Useful and preferred systems are described in, for example, previously incorporated U.S. Pat. No. 5,955,555, as well as in WO99/12981, WO99/46302, WO99/46303, WO99/46304, WO99/46308, WO99/62963 (corresponding to U.S. patent application Ser. No. 09/317,104, filed May 21, 1999, now U.S. Pat. No. 6,252,022), WO00/15646, WO00/24788, WO00/32641 (all of which are incorporated by reference herein for all purposes as if fully set forth), and reference may be had thereto for further details.

The process may be run in any way in which all three (or more, if present) of the catalysts are active for their intended use. For instance, if each of the catalysts is a metal halide (or other anion $X^-$ such as carboxylate, acetylacetonate, etc.) complex the process may be run at a temperature of about −100° C. to about +200° C., more preferably about 0° C. to about 100° C.

The "pure" Fe complexes of (I), (II) and (III) may be exemplified by the formulas (I)$FeX_n$, (II)$FeX_n$ and (III)$FeX_n$, wherein each X is an anion, n is 1, 2 or 3 so that the total number of negative charges on the X groups is equal to the oxidation state of the Fe in the pure Fe complex. Preferably, each X is a monovalent anion, more preferably selected from the group consisting of halide and carboxylate, and especially a halide such as chloride or bromide.

The various complexes (such as the pure Fe complexes) may in and of themselves be active catalysts, or they may be activated (or made more active) preferably by preparation in situ by contact with a catalyst activator in a variety of methods. Generally, it has been found that the most active catalysts are those that have been contacted with a catalyst activator.

The various complexes may be activated by contact with a first compound W, which is a neutral Lewis acid capable of abstracting $X^-$ to form $WX^-$, provided that the anion formed is a weakly coordinating anion; or a cationic Lewis or Bronsted acid whose counterion is a weakly coordinating anion.

In those instances in which the Fe complex of (I), (II) or (III) does not contain an alkyl, hydride, or other group which may be displaced by ethylene already bonded to the metal (i.e., X is not alkyl or hydride), a neutral Lewis acid or a cationic Lewis or Bronsted acid may also alkylate or add a hydride to the metal, i.e., causes an alkyl group or hydride to become bonded to the metal atom, or a separate compound is added to add the alkyl or hydride group.

A preferred neutral Lewis acid, which can alkylate the metal, is a selected alkyl aluminum compound, such as $R^{30}{}_3Al$, $R^{30}{}_3AlCl$, $R^{30}AlCl_2$, and "$R^{30}AlO$" (alkylaluminoxanes), wherein $R^{30}$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $(C_2H_5)AlCl_2$ and $[(CH_3)_2CHCH_2]_3Al$. Metal hydrides such as $NaBH_4$ may be used to bond hydride groups to the metal M.

In the process of the present invention at least two polymers are produced, and both of them may be thought of as homopolyethylenes (assuming no other olefins are introduced and copolymerized in the process). Other olefins, such as propylene or 1-butene may also optionally be added to the process and may be copolymerized into the lower density polyethylene, but these other olefins should not be extensively copolymerized into the relatively higher density (containing less branching) polyethylene.

However it is to be understood that (at least) one of polymers produced, the relatively lower density and/or more highly branched polyethylene, is not made by the direct polymerization of ethylene alone, but by the copolymerization of ethylene and one or more α-olefins which may be, and preferably are, produced in situ. This polymer (the first, third and where applicable fifth polyethylenes herein) usually contain (assuming no other olefins added to the process) only branches of the formula (excluding end groups) —$(CH_2CH_2)_nH$ wherein n is 1 or more, preferably 1 to 100, more preferably 1 to 30, of these branches per 1000 methylene atoms. Normally there will be branches with a range of "n" in the polymer. The amount of these branches (as measured by total methyl groups) in the polymer preferably ranges from about 2 to about 200, especially preferably about 5 to about 175, more preferably about 10 to about 150, very preferably about 20 to about 150, and particularly preferably 25 to 100 branches per 1000 methylene groups in the polymer. For the method of measurement ($^{13}C$ NMR) and calculation, see previously incorporated U.S. Pat. No. 5,880,241. Another preferable range for these branches is about 50 to about 200 methyl groups per 1000 methylene carbon atoms. It is also preferable (either alone or in combination with the other preferable features above) that in the first, third and fifth polyethylenes there are at least 2 branches each of ethyl and n-hexyl or longer and at least one n-butyl per 1000 methylene groups, more preferably at least 4 branches each of ethyl and n-hexyl or longer and at least 2 n-butyl branches per 1000 methylene groups, and especially preferably at least 10 branches each of ethyl and n-hexyl or longer and at least 5 n-butyl branches per 1000 methylene groups. It is also preferred that there are more ethyl branches than butyl branches. In another preferred first, third or fifth polyethylene (alone or in combination with any of the above preferred features) there is less than 20 methyl branches, more preferably less than 2 methyl branch, and especially preferably less than 2 methyl branches (all after correction for end groups) per 1000 methylene groups.

The other polymer produced, the higher density and/or lower branching level second, fourth or sixth polyethylenes are preferably relatively unbranched, more preferably having less than 15 branches (as measured by total methyl groups, corrected for end groups) per 1000 $CH_2$ groups, more preferably less than less than 5 branches/1000 $CH_2$ groups. It is also preferred that this polymer have a melting point of about 115° C. or higher, more preferably about 125° C. or higher, and/or have a density of about 0.93 g/mL or more, more preferably about 0.94 g/mL or more, and/or the more branched (first, third or fifth) polyethylene have a density of less than 0.93 g/mL, more preferably less than about 0.92 g/mL.

Any of the above preferred limitations on any of the polyethylenes may be combined with any other limitation, so long as these limitations do not conflict with each other or with limitations on the blends described herein. It is also to be understood that branches containing an odd number of carbon atoms may also be present in these polyethylenes from addition of olefins containing an odd number of carbon atoms to the polymerization. These latter polyethylenes will not be homopolyethylenes, but may otherwise be covered herein. If present, preferably less than about 5 mole percent, more preferably less than about 2 mole percent, and especially preferably less than about 1 mole percent of the copolymerized olefins will be olefins with an odd number of carbon atoms.

In the first polymer blend herein it is preferred that the weight ratio of the first and second polyethylenes is in the range of from about 1:4 to about 2:1, more preferably in the range of from about 1:4 to about 1:1, based on the combined weight of the first and second polyethylenes; and/or said second polyethylene has a melting point at least about 30° C., more preferably 50° C. higher than said first polyethylene; and/or said second polyethylene has a heat of fusion at least about 100 J/g greater than the heat of fusion of said first polyethylene.

In the first through sixth polyethylenes here it is preferred that they are homopolyethylenes. Furthermore in the polymerization process herein and in preparation of the first, second and third polymer blends herein it is also preferred that the oligomerization of ethylene and the polymerization carried out by the first and second polymerization catalysts be carried out essentially simultaneously in the same reactor(s).

In one preferred method, the oligomerization catalyst and the first polymerization catalyst are supported on the same support particles, and the second polymerization catalyst is supported on other support particles, each "set" of support particles being the same or different materials. Using this method it is especially preferred that the process is carried out in the gas phase.

In another preferred method the oligomerization catalyst, first polymerization catalyst and second polymerization catalyst are all supported on the same catalyst particles. While gas phase polymerization is again preferred, this process may also be carried out in solution or slurry polymerization. The second polymerization catalyst preferably has little or no tendency to copolymerize ethylene and α-olefins.

In another preferred process the process is carried out in solution or slurry with one or more, preferably all of the catalysts, being unsupported. Again the second polymerization catalyst preferably has little or no tendency to copolymerize ethylene and α-olefins.

In all of the processes, it is preferred that the second polymerization catalyst has little or no tendency to co-polymerize ethylene and α-olefins.

It is preferred that one or more of the catalysts be present as a complex with the appropriate transition metal and that the anions for the transition metal be monoanions, such as halide, especially chloride or bromide, carboxylate, acetylacetonate, etc. In such a case, as indicated above, a cocatalyst or activator is usually needed, such as an alkylaluminum compound. If a support is used, the alkylaluminum compound may also be present (supported) on the support. Other items normally present in transition metal complex catalyzed polymerization of ethylene, such as hydrogen to regulate the molecular weight of the polymers formed, may also be present.

The polymerization catalyst component comprises an oligomerization catalyst and two polymerization catalysts (which may be chemically identical but produce different polymers). This component may be a "single" material, i.e., a support particles having on them all three catalysts (plus optionally one or more cocatalysts), or may be a mixture of two materials such as support particles having the oligomerization catalyst and the first polymerization catalyst supported thereon, and other support particles having the second polymerization catalyst supported thereon, and optionally one or more cocatalysts supported on one or both sets of particles. It may be a solution or slurry of all three catalysts. In these catalyst components (and in the polymerization/oligomerization process) preferred cocatalysts are alkylaluminum compounds, and methylaluminoxane is especially preferred.

In many instances, in order to measure the melting point, heat of fusion, branching levels and/or branching distributions of the polymer blends produced herein accurately, it is first necessary to separate the polymers in the blend. This may conveniently done by TREF, Temperature-Rising Elution Fractionation, which basically separates polymers on the basis of melting point (crystallinity). The fractions may be quantitated by various detectors, and these fractions detected and analyzed, for example for density, and by DSC, NMR, and GPC. If enough polymer is not collected in one TREF run, several runs may be made to collect enough polymer for various analyses desired. The fractions for the purposes of determining the amount of each polymer in the blend may be grouped together, for example the two polymers giving a bimodal distribution may be collected as several fractions each, but these fractions may be grouped together to determine how much, for example, of a higher melting and lower melting polymer there is. The shape of the TREF curve may be used, and mathematical modeling may be used to determine the amounts of each fraction on overlapping TREF peaks. A description of TREF may be found in L. Wild, *Adv. Polym. Sci.*, vol. 98, p. 1–47 (1990); G. Glockner, *J. Appl. Polym. Sci., Polym. Symp.*, vol. 45, p. 1 et seq. (1990); L. G. Hazlitt, *J. Appl. Polym. Sci., Appl. Polym. Symp.*, vol. 45, p. 25 et seq., (1990); I Mingozzi, et al., *J. Polym. Anal. Charact.*, vol. 3, p. 293 et seq., (1997); and the first 2 chapters in R. A. Petrick, et al., Ed., *Modern Techniques for Polymer Characterization*, John Wiley & Sons, Chichester, 1999.

Density is determined by ASTM Method D1928, Method C with the following changes. Polytetrafluororethylene coated aluminum foil is used for the parting sheets, backing plates are not used, and the samples is heated for 1.5 min at 180° C. The sandwich of Al foil and the Teflon® FEP fluoropolymer chase are placed directly on the platens of the hot press. Density is measured using the method of ASTM D1505. Melting point and heat of fusion of polymers is measured using the method of ASTM D3417-97, on the second heat and using a heating rate of 10° C./min, taking the maximum of the melting endotherm as the melting point.

The number of branches in a polyethylene is measured taken as the total number of methyl groups per 1000 methylene (CH$_2$) groups, after correction for end groups (in other words, end groups are not included in the total). Branching distribution is measured by $^{13}$C NMR and is corrected for end groups (although herein corrected results are not given). Methods for both these NMR measurements are found in previously incorporated U.S. Pat. No. 5,880,241.

Molecular weights are measured using Gel Permeation Chromatography using appropriate standards.

In the Examples, all pressures are gauge pressures. The following abbreviations are used:

$\Delta H_f$—heat of fusion
DSC—differential scanning calorimetry
GC—gas chromatography
GPC—gel permeation chromatography
MAO—methylaluminoxane
Me—methyl
Mw—weight average molecular weight
PE—polyethylene
PDI—weight average molecular weight/number average molecular weight
RT—room temperature
TCE—trichloroethylene In the Examples, the following compounds were used:

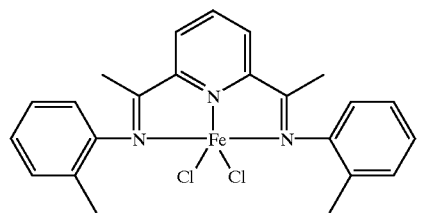

A

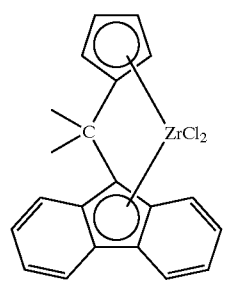

B

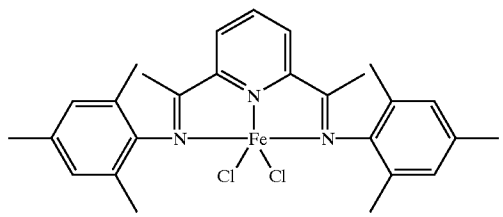

C

EXAMPLE 1

General procedure for making silica supported catalysts:

In a drybox, A (0.1 wt % in biphenyl, the weight in Table 1 are the solution weights), B and/or C, and silica supported methylaluminoxane (0.35 g, 18 wt % in Al, Albamarle) were mixed with 15 mL of toluene in a 20 mL vial. The vial was shaken for 30 min at RT. The solid was filtered, washed with 3×5 mL toluene and dried in vacuo for 1 h. It was then stored in a freezer in the drybox and was used the same day. Details of catalyst components are listed in Table 1.

EXAMPLES 2–5 AND COMPARATIVE EXAMPLES A–C

In a drybox, supported catalysts (total 5.0 mg) were weighed in GC vials. They were placed in a multitube block reactor (more than one polymerization could be run at once). The reactor was brought out of the drybox and was charged with 1.21 MPa of ethylene. It was then placed in a 90° C. oil bath for 1 h under 1.21 MPa of ethylene. Polymers were isolated, weighed and then analyzed without purification by $^1$HNMR (TCE-d$_2$, 120° C.), GPC and DSC. Results of the various polymerization runs are given in Table 2.

TABLE 1

| Catalyst | Compound(s) and amount | Amount of A (0.1 wt % in biphenyl) | Silica Supported MAO (18 wt %) | Toluene (mL) | Al:M:A Ratio M = Zr, Fe |
|---|---|---|---|---|---|
| I | B, 1.0 mg | 0 | 0.35 g | 15 | 1000:1:0 |
| II | C, 1.2 mg | 0 | 0.35 g | 15 | 1000:1:0 |
| III | B, 1.0 mg | 27.3 mg | 0.35 g | 15 | 1000:1:0.025 |
| IV | B, 1.0 mg | 109.2 mg | 0.35 g | 15 | 1000:1:0.1 |
| V | B, 1.0 mg C, 1.2 mg | 54.6 mg | 0.35 g | 15 | 1000:1 Zr, 1 Fe:0.05 |

TABLE 2

| Ex. | Catalyst(s) And Amount | PE yield (g) | TON* | #Me/ 1000 CH$_2$ | Mw/PDI | m.p. [° C./$\Delta H_f$ (J/g)] |
|---|---|---|---|---|---|---|
| 2 | I, 2.5 mg IV, 2.5 mg | 0.175 | 180,000 | 21 | 198,985/5.1 | 116/106.0 |
| 3 | II, 2.5 mg IV, 2.5 mg | 0.340 | 350,000 | 25 | 124,009/5.2 | 132/101.8 |
| 4 | III, 2.5 mg IV, 2.5 mg | 0.389 | 400,000 | 26 | 183,845/5.2 | 119**/100.4 |

TABLE 2-continued

| Ex. | Catalyst(s) And Amount | PE yield (g) | TON* | #Me/ 1000 CH$_2$ | Mw/PDI | m.p. [° C./ΔH$_f$ (J/g)] |
|---|---|---|---|---|---|---|
| 5 | V, 5 mg | 0.417 | 440,000 | 23 | 169,050/7.3 | 116**/98.6 |
| A | II, 5 mg | 0.243 | 270,000 | 2 | 147,758/7.9 | 133/212.5 |
| B | III, 5 mg | 0.351 | 370,000 | 14 | 222,394/4.4 | 117/105.7 |
| C | IV, 5 mg | 0.125 | 120,000 | 59 | 50,342/26.2 | 124/17.2 |

*moles of ethylene/mole of catalyst(s) .hr
**large shoulder

What is claimed is:

1. A process for producing a blend of two or more polyethylenes, comprising the step of contacting:

(1) ethylene;

(2) an active ethylene oligomerization catalyst under conditions to oligomerize at least a portion of the ethylene to one or more α-olefins of the general formula $R^{18}CH=CH_2$, wherein $R^{18}$ is alkyl containing an even number of carbon atoms;

(3) a first active polymerization catalyst under conditions to copolymerize ethylene and the α-olefins generated from the active ethylene oligomerization catalyst; and (4) a second active polymerization catalyst under conditions to polymerize ethylene, but not readily copolymerize ethylene and α-olefins;

wherein each of the oligomerization catalyst, the first polymerization catalyst and the second polymerization catalyst is chemically distinct from the other two.

2. The process as recited in claim 1 wherein the active ethylene oligomerization catalyst is an Fe complex of a ligand of the general formula (I)

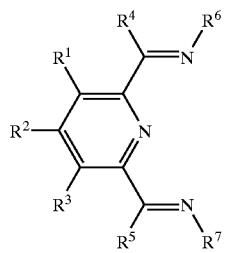

(I)

wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

3. The process as recited in claim 2 wherein the active ethylene oligomerization catalyst is an Fe complex of a ligand of the general formula (II):

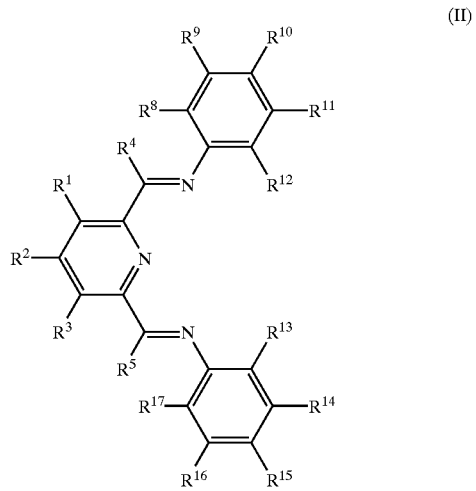

(II)

wherein:

each of $R^1$, $R^2$, $R^3$, $R^4$, $R^5$, $R^9$, $R^{10}$, $R^{11}$, $R^{14}$, $R^{15}$ and $R^{16}$ is independently selected from the group consisting of hydrogen, hydrocarbyl, substituted hydrocarbyl and an inert functional group; and $R^8$ is a primary carbon group, a secondary carbon group or a tertiary carbon group;

provided that:

when $R^8$ is a primary carbon group none, one or two of $R^{12}$, $R^{13}$ and $R^{17}$ are independently a primary carbon group, an inert functional group or a trihalo tertiary carbon group, and the remainder of $R^{12}$, $R^{13}$ and $R^{17}$ are hydrogen;

when $R^8$ is a secondary carbon group, none or one of $R^{12}$, $R^{13}$ and $R^{17}$ is a primary carbon group, a secondary carbon group, a trihalo tertiary carbon group or an inert functional group, and the remainder of $R^{12}$, $R^{13}$ and $R^{17}$ are hydrogen;

when $R^8$ is a tertiary carbon group all of $R^{12}$, $R^{13}$ and $R^{17}$ are hydrogen;

any two of $R^1$, $R^2$ and $R^3$ vicinal to one another, taken together may form a ring; and any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

4. The process as recited in claim 1 wherein the second active polymerization catalyst is chemically different than the first active polymerization catalyst, and has little or no tendency to copolymerize ethylene and α-olefins.

5. The process as recited in claim 1 wherein the second active polymerization catalyst is an Fe complex of a ligand of the general formula (III):

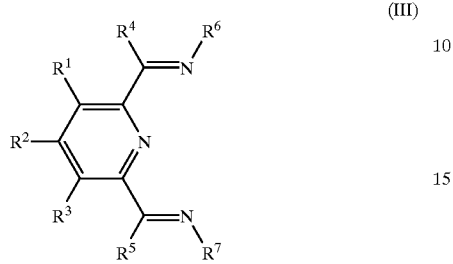

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

6. The process as recited in claim 1 wherein the first polymerization catalyst is a metallocene catalyst.

7. The process as recited in claim 1 wherein the oligomerization catalyst, first polymerization catalyst and second polymerization catalyst are supported.

8. The process as recited in claim 7 carried out in the gas phase.

9. The process as recited in claim 1 wherein the polyethylenes are homopolyethylenes.

10. The process as recited in claim 2 wherein the second active polymerization catalyst is chemically different than the first active polymerization catalyst, and has little or no tendency to copolymerize ethylene and α-olefins.

11. The process as recited in claim 10 wherein the first polymerization catalyst is a metallocene catalyst, and the second active polymerization catalyst is an Fe complex of a ligand of the general formula (III):

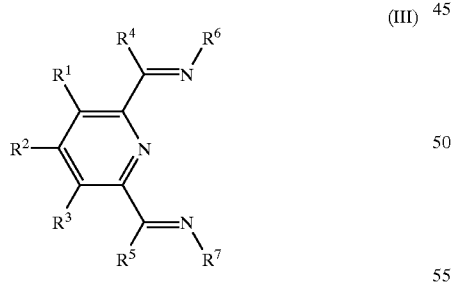

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

12. A polymerization catalyst component, comprising:
(a) an oligomerization catalyst that oligomerizes ethylene to one or more α-olefins of the formula $H_2C{=}CHR^{18}$, wherein $R^{18}$ is an alkyl containing an even number of carbon atoms, and wherein said alpha-olefins have an average degree of polymerization of 30 or less;
(b) a first polymerization catalyst that is capable of copolymerizing ethylene and one or more α-olefins of the formula $H_2C{=}CHR^{18}$; and
(c) a second polymerization catalyst chemically distinct from the first polymerization catalyst, that is capable of polymerizing ethylene but does not readily copolymerize ethylene and α-olefins;
wherein the oligomerization catalyst is chemically distinct from each of the first and second polymerization catalysts.

13. The polymerization catalyst component as recited in claim 12, further comprising (d) one or more catalyst supports onto which one or more of (a), (b) and/or (c) has been supported.

14. The polymerization catalyst component as recited in claim 12 wherein the ethylene oligomerization catalyst is an Fe complex of a ligand of the general formula (I)

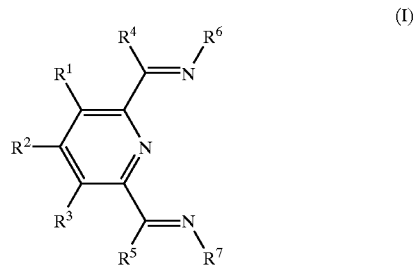

wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:
in $R^6$, a second ring atom adjacent to said first ring atom is bound to a halogen, a primary carbon group, a secondary carbon group or a tertiary carbon group; and further provided that
in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or
in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or
in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

15. The polymerization catalyst component as recited in claim 14 wherein the ethylene oligomerization catalyst is an Fe complex of a ligand of the general formula (II):

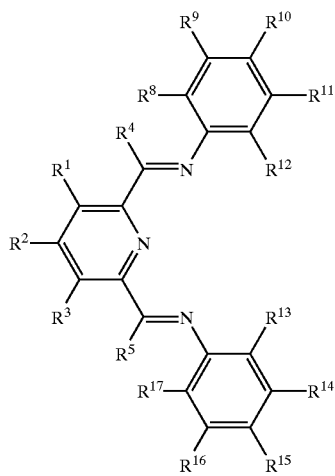

(II)

wherein:
each of $R^1$, $R^2$, $R^3$, $R^4$, $R^5$, $R^9$, $R^{10}$, $R^{11}$, $R^{14}$, $R^{15}$ and $R^{16}$ is independently selected from the group consisting of hydrogen, hydrocarbyl, substituted hydrocarbyl and an inert functional group; and $R^8$ is a primary carbon group, a secondary carbon group or a tertiary carbon group;

provided that:
when $R^8$ is a primary carbon group none, one or two of $R^{12}$, $R^{13}$ and $R^{17}$ are independently a primary carbon group, an inert functional group or a trihalo tertiary carbon group, and the remainder of $R^{12}$, $R^{13}$ and $R^{17}$ are hydrogen;

when $R^8$ is a secondary carbon group, none or one of $R^{12}$, $R^{13}$ and $R^{17}$ is a primary carbon group, a secondary carbon group, a trihalo tertiary carbon group or an inert functional group, and the remainder of $R^{12}$, $R^{13}$ and $R^{17}$ are hydrogen;

when $R^8$ is a tertiary carbon group all of $R^{12}$, $R^{13}$ and $R^{17}$ are hydrogen;

any two of $R^1$, $R^2$ and $R^3$ vicinal to one another, taken together may form a ring; and any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

16. The polymerization catalyst component as recited in claim 12 wherein the second active polymerization catalyst is an Fe complex of a ligand of the general formula (III):

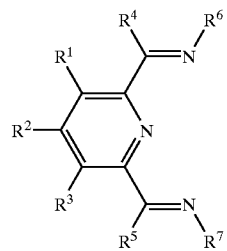

(III)

wherein:
$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

17. The polymerization catalyst component as recited in claim 12 wherein the first polymerization catalyst is a metallocene catalyst.

18. The polymerization catalyst component as recited in claim 12 wherein the first polymerization catalyst is a metallocene catalyst, and the second active polymerization catalyst is an Fe complex of a ligand of the general formula (III):

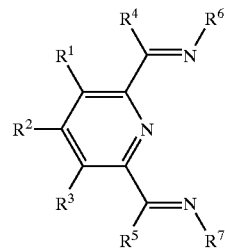

wherein:
$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

19. The polymerization catalyst component as recited in claim 18, further comprising (d) one or more catalyst supports onto which one or more of (a), (b) and/or (c) has been supported.

20. The polymerization catalyst component as recited in claim 12 wherein said average degree of polymerization is 15 or less.

* * * * *